Feb. 3, 1942.     C. A. CAMPBELL     2,271,894
SELF-LUBRICATING BRAKE VALVE
Filed Nov. 25, 1940
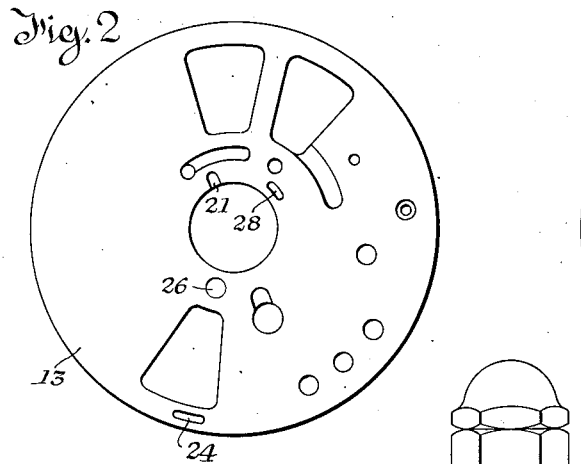
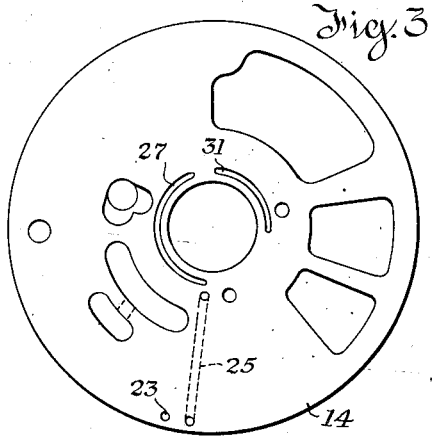
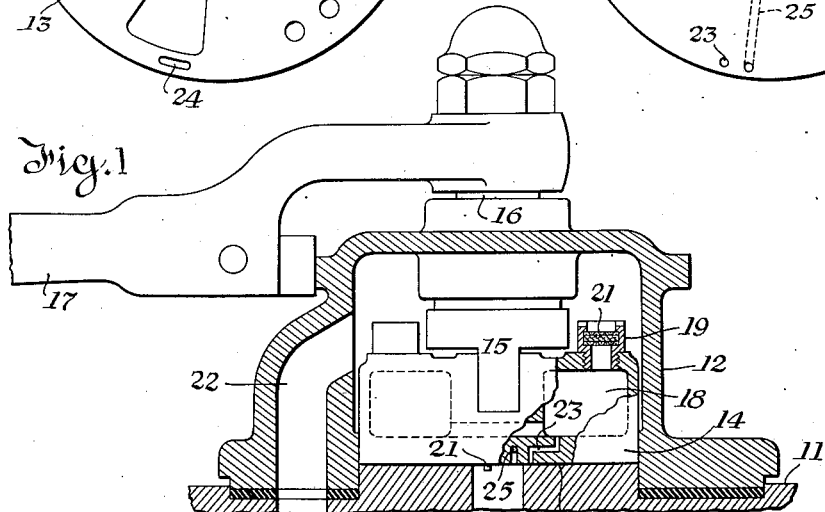
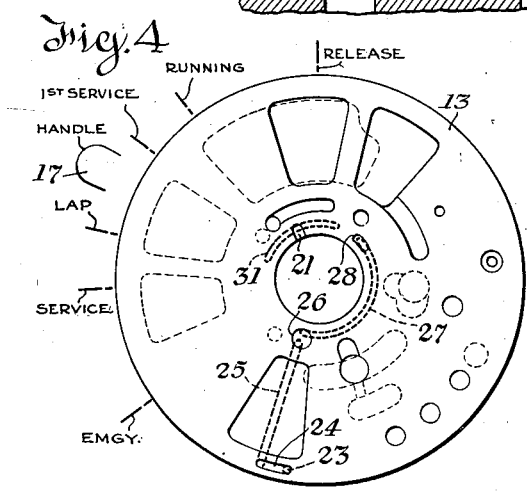
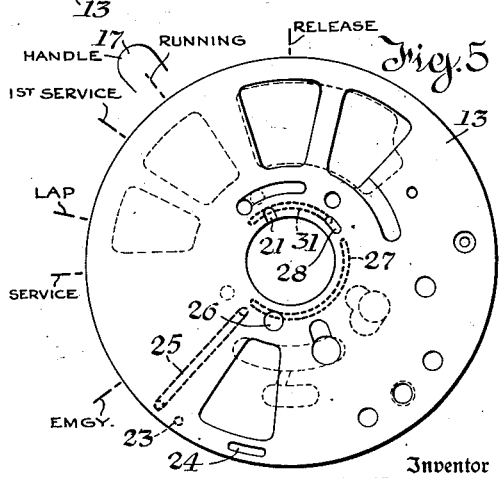
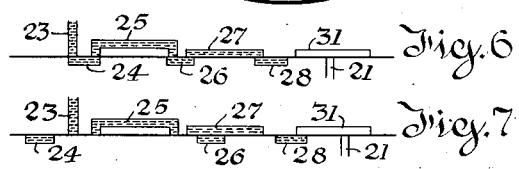
Inventor
Charles A. Campbell
Deceased
By Carrie E. Campbell
Administratrix
By
Attorneys Patented Feb. 3, 1942

2,271,894

UNITED STATES PATENT OFFICE 2,271,894

SELF-LUBRICATING BRAKE VALVE

Charles A. Campbell, deceased, late of Watertown, N. Y., by Carrie E. Campbell, administratrix, Watertown, N. Y., assignor to The New York Air Brake Company, a corporation of New Jersey Application November 25, 1940, Serial No. 367,145

8 Claims. (Cl. 303—56)

This invention relates to air brakes and particularly, though not exclusively, to lubrication of the rotary valve forming part of an engineer's brake valve.

The lubrication of rotary valves forming part of engineer's brake valves has long been a difficult problem. Lubrication of the valve is essential because the valve is of substantial diameter and subject on its top face to an air pressure of the order of 100 to 120 lbs. per sq. in. Free action of the valve is very important. Since the valve is heavily loaded, it is difficult to feed oil to the seated area and important that excessive oil be not fed, because if excessive feed occurs the oil will be carried to parts of the system where it will occasion maintenance difficulties. Thus a successful solution of the problem involves very precise oil feed. The quantity fed must be adequate at all times and must never be excessive. Precise feed under all conditions of operation is a condition only recently attained.

In a prior patent issued to applicant on July 23, 1940, numbered 2,209,258, there is described a self-lubricating brake valve which has demonstrated highly valuable operating characteristics. In that device the supply of oil is carried in cavities formed in the rotary valve and oil is fed by main reservoir air pressure, which acts on the top of the valve, to a groove or grooves in the mating area of the valve and seat. In one position of the valve, to which it is moved frequently but for brief periods, a flow path is opened from each groove to a connection at a pressure lower than the pressure existing in the main reservoir. Preferably this low pressure connection led to atmosphere. The effect was to develop upon the oil in the groove a feeding pressure differential which supplies oil to the lubricating groove.

In any such device it is imperatively necessary to provide flow restricting means to limit the rate at which the oil may flow. In the patent above identified use is made of a so-called metering pin which nearly, but not quite, fills a metering orifice. The manufacture of precise metering orifices and pins is somewhat difficult and is expensive. The present invention is the successful result of efforts to eliminate the need for metering, and at the same time avail of useful operative characteristics of the self-lubricating valve disclosed in the above identified patent.

The present invention is based on appreciation of the fact that when oil is withdrawn or displaced from the lubricating groove which is exposed within the mating area of the valve and seat, the oil so displaced must be replaced by air and in fact is so replaced because the air is the only other fluid present. The oil is substantially incompressible, while the air is compressible, and this fact is availed of to secure the desired feeding of the oil.

Generally stated, there is provided what is called a feed passage, a part of which takes the form of a groove or grooves in the mated area. This feed passage leads from the oil reservoir. In one position of the rotary valve the feed passage communicates at its other end with a small receptor cavity, preferably formed in the seat of the valve. In another position of the rotary valve the feed passage is disconnected at least from the receptor cavity and the receptor cavity is so connected to atmosphere as to permit the escape of air. Thus the atmospheric port characteristic of the previous invention is used but there is never a direct connection from the oil reservoir to the atmospheric vent. The feed of the oil is dependent on compression of the air that enters the lubricating groove to replace oil withdrawn therefrom.

Generally stated, when oil in the feed passage has been partially replaced by air, the placing of the valve in the first named position results in compression of such air and the entrance of some oil. This condition extends to the receptor cavity. When the receptor cavity is disconnected from the feed passage and connected to atmosphere, the air in the receptor cavity expands and at least a part escapes to atmosphere. The effect is that the alternate expansion and compression of air occluded in the oil, or present in the oil in the form of small droplets, results in the forward feed of oil. It can only move forward because only admission of oil is possible at the entrance end and discharge of air from the receptor cavity is provided for. By suitably coordinating the volume of the receptor cavity and the length of the feed passage, the rate of feed of oil can be fixed and can be held within very close limits. It should be observed that the feed passage is not alternately connected to supply and exhaust but on the contrary, in the preferred form, is at one time connected to supply and to a receptor cavity and at other times is disconnected from both. The receptor cavity, in intervals of disconnection from the feed passage, is vented to atmosphere. The effect is to keep the lubricating grooves, which form links in the feed passage, practically full of oil at all times.

The invention can be applied to a wide variety of valves but in order to illustrate its incorporation in a commercial valve and to illustrate the means used to avoid interference with the valve functions, the invention will be described as incorporated in an H-6 engineer's brake valve. This valve is so well known in the air brake art that a description of its porting and valve functions is deemed to be wholly unnecessary.

In referring to the lubricating functions, two positions have been mentioned; a first position in which the feed passage is connected to supply and to the receptor cavity, and a second position in which the receptor cavity is disconnected from the feed passage and vented to atmosphere. These positions can be variously selected but the preferred arrangement and the one shown in the drawing is such that the first position is between first service and lap position and the second position coincides with running position. Persons familiar with the braking art will realize, therefore, that the first position is assumed only momentarily but rather frequently because the valve is often shifted between first service and lap position. The second position, which coincides with running position, is assumed for considerable periods because the brake valve is customarily carried in running position and is moved therefrom only during brake applications and the release of such applications.

The above being the general principle of the invention, its embodiment in an H-6 valve will now be described by reference to the accompanying drawing, in which:

Fig. 1 is a section through the rotary valve chamber of an H-6 brake valve. The seat for the rotary valve is shown in section. The rotary valve is shown in elevation with portions broken away to show the location of the oil reservoir within the valve.

Fig. 2 is a plan view of the rotary valve seat.

Fig. 3 is a face view of the rotary valve.

Fig. 4 is a composite view showing the valve seat of Fig. 2 in full lines with the ports of the valve of Fig. 3 indicated in dotted lines. In this view the air ports are lightly indicated and the lubricating ports which form the subject of the invention are emphasized. Fig. 4 shows the so-called first position between first service and lap in which the opposite ends of the feed passage are connected respectively to the oil reservoir and to the receptor cavity.

Fig. 5 is a view similar to Fig. 4 showing the so-called second position in which the feed passage is disconnected from the oil reservoir and from the receptor cavity and the receptor cavity is connected to an atmospheric port which typifies any port at a pressure materially lower than main reservoir pressure.

Fig. 6 is a diagrammatic development of the oil path in first position.

Fig. 7 is a diagram illustrating the conditions which exist in second position.

With reference to Figs. 6 and 7 it should be observed that since certain portions of the feed passage are arcuate and another portion radial, it is necessary to resort to an arbitrary convention which apparently indicates change in length of certain of the passages. The purpose of Figs. 6 and 7 is to make clear that the feed passage is made up of connected links in the first position and that these links are disconnected in the second position. The figures are diagrams and not true dimensional representations of the ports.

Referring first to Fig. 1, 11 represents the valve seat portion of an H-6 brake valve and 12 represents the cap portion. The seat proper on the seat portion 11 is indicated at 13 and on this is rotatably mounted the rotary valve 14. This is slotted to receive a key 15 fixed on the lower end of a stem 16. The stem 16 is moved by means of the usual brake valve handle 17. Conventional air ports in the seat of the H-6 brake valve are clearly illustrated in Fig. 2. No reference numerals are applied thereto. Thus all of the numbered ports in Fig. 2 have to do with the present invention and are lubrication ports.

The face of the rotary valve 14 is shown in Fig. 3 and in this view the familiar air ports are not given reference numerals, while the ports and grooves having to do with lubrication do bear reference numerals.

The rotary valve 14 is provided with an oil reservoir 18. There is a filling port into which is threaded a plug 19. Plug 19 is not closed but has an axial passage in which is mounted a pad 21 of porous felt confined between layers of wire gauze. Thus the oil in the chamber 18 is subject to the pressure within the cap 12 and, as is well understood, the space within the cap 12 is connected with the main reservoir of the brake system by means of a passage 22. It will also be appreciated that main reservoir pressure is usually from 100 to 120 lbs. per sq. in. gauge.

Leading from the oil reservoir 18 to the seated face of the valve 14 is a small passage 23 (see Figs. 1 and 3). In the first position (Fig. 4) passage 23 communicates with one end of the arcuate groove 24 in seat 13. The other end of the arcuate groove 24 then communicates from the radial passage 25 which is internal to the valve 14 except at its ends (see Fig. 6). One end communicates with the arcuate passage 24 and the other end communicates with the cavity 26 formed in the seat 13.

In the first position the cavity 26 also communicates with one end of an arcuate groove 27 cut in the face of the valve 14 and subtending an angle of approximately 120°. In the first position the other end of the groove 27 communicates with the receptor cavity 28. Thus in the first position there is a continuous feed passage from the port 23 to the receptor cavity 28 and that feed passage is made up of four links, namely the arcuate groove 24, the internal passage 25, the cavity 26 and the arcuate groove 27. The grooves 24 and 27 are exposed to the seated or mating area between the valve and seat and the same is true of the receptor cavity 28.

In the seat there is an atmospheric vent passage 21 and in the rotary valve there is a second and distinct arcuate groove 31 so located that in the second position (Fig. 5) the arcuate groove 31 connects the receptor cavity 28 with the vent passage 21. At such time the groove 27 is out of communication with the receptor cavity 28, though it remains in communication with the cavity 26. In the second position also the passage 25 is out of communication with the cavities 24 and 26 and the port 23 is out of communication with the cavity 24. Thus two component links of the feed passage are completely separated in position two and in fact they engage to form the feed passage only in position one (see Fig. 4).

It is considered desirable, but not absolutely necessary, to disrupt the feed passage except in one position which is assumed momentarily (the first position shown in Fig. 4). Thus there can be a brief surge of oil toward the receptor cavity 28 for only a very short period of time and whenever the valve is moved to release position the receptor cavity is connected to atmosphere and thus vented.

The invention avoids the use of all metering pins or orifices, provides absolute control of oil flow and affords direct control of the rate of oil flow because the size of the receptor cavity determines the amount of expansion which is permitted at each venting operation. The effect is to produce an inexpensive and highly reliable lubricating system which can be designed to feed at any desired rate within the limits required for practical lubrication of rotary valves.

There has been chosen for illustration a relatively complicated embodiment of the inventive concept. For example, where pressure conditions are not too severe the feed passage need not be composed of links or sections which are segregated except in the feed position. The purpose in adopting the relatively complex arrangement here illustrated is to develop the various refinements which can be used to meet particularly difficult conditions without implying that this relatively complicated scheme is necessary in all cases. The basic principle is the use of a feed passage which simultaneously communicates with the reservoir and the receptor in conjunction with means to vent the receptor during periods of its disconnection from the feed passage.

It is claimed:

1. In an air brake valve the combination of a valve seat; a valve shiftable thereon, said valve being urged against said seat by the pressure of compressed air supply controlled by the valve, there being at least one lubricating oil groove in the mating area between valve and seat; a lubricant reservoir so arranged that the lubricant is under the pressure of air supply; means forming a receptor cavity; port means controlled by the valve for connecting opposite extremities of said groove with the reservoir and receptor in one position of the valve; and port means controlled by the valve for venting air from the receptor in another position of the valve, the parts being so arranged that the receptor is isolated except when connected in one or the other of the ways above stated.

2. The combination defined in claim 1 in which the receptor cavity is formed in the mating area between valve and seat.

3. In an air brake valve the combination of a valve seat; a valve shiftable thereon, said valve being urged against said seat by the pressure of compressed air supply controlled by the valve, there being at least one lubricating oil groove in the mating area between valve and seat; a lubricant reservoir so arranged that the lubricant is under the pressure of air supply; means forming a receptor cavity; port means controlled by the valve for venting air from said receptor cavity in a position which the valve assumes frequently and for substantial periods; and port means controlled by the valve and effective only when said vent is closed to connect said groove simultaneously with said reservoir and receptor, the parts being so arranged that air when present in the groove will be compressed and shifted toward the receptor by entering oil.

4. In an air brake valve the combination of a ported valve seat; a supply and exhaust valve shiftable on said seat and held thereagainst by the pressure of compressed air supply controlled by the valve; a lubricant reservoir containing liquid lubricant subject on its upper face to supply fluid pressure; a receptor cavity in a mated surface of the seat and valve; and ports arranged to provide in two different positions of the valve two functionally distinct flow paths, one from the reservoir at a point below the liquid level therein to the receptor, and the other from the receptor to a low pressure air vent, the parts being so arranged that the receptor is isolated except when connected in one or the other of the ways above stated.

5. In an air brake valve the combination of a ported valve seat; a supply and exhaust valve shiftable on said seat and held thereagainst by the pressure of compressed air supply controlled by the valve; a lubricant reservoir containing liquid lubricant subject on its upper face to supply fluid pressure; a receptor cavity in a mated surface of the seat and valve; and ports arranged to provide in two different positions of the valve two functionally distinct flow paths, one comprising a plurality of normally unconnected sections, at least one of which is a groove in a mated face, such path when established leading from the reservoir at a point below the liquid level therein to the receptor, and the other path leading from the top of the receptor to atmosphere, the parts being so arranged that the receptor is isolated except when connected in one or the other of the ways above stated.

6. In an air brake valve the combination of a ported valve seat; a supply and exhaust valve shiftable on said seat and held thereagainst by the pressure of compressed air supply controlled by the valve; a lubricant reservoir containing liquid lubricant subject on its upper face to supply fluid pressure; a receptor cavity in a mated surface of the seat and valve; and ports arranged to provide in two different positions of the valve two functionally distinct flow paths, one comprising a plurality of normally unconnected sections, at least two of which are grooves in a mated face near a margin thereof and extending approximately in the direction of valve travel, such flow path being established as the valve shifts from one functional position to another, and the other flow path being established in a functional position of the valve in which the latter remains for an appreciable time interval and leads from the top of the receptor to atmosphere, whereby it serves to discharge compressed air which would otherwise tend to accumulate in the receptor.

7. In an air brake valve, the combination of a ported valve seat; a supply and exhaust valve shiftable on said seat and held thereagainst by the pressure of compressed air supply controlled by the valve; a lubricant reservoir containing liquid lubricant subject on its upper face to supply air pressure; a receptor cavity in a mated surface of the seat and valve; and ports arranged to provide in two different positions of the valve two functionally distinct flow paths, one from the reservoir at a point below the liquid level therein to the receptor, said path being established in a position which the valve assumes briefly, and the other from the receptor to a low pressure air vent.

8. In an air brake valve, the combination of a ported valve seat; a supply and exhaust valve shiftable on said seat and held thereagainst by the pressure of compressed air supply controlled by the valve; a lubricant reservoir containing liquid lubricant subject on its upper face to supply air pressure; a receptor cavity in a mated surface of the seat and valve; and ports arranged to provide in two different positions of the valve two functionally distinct flow paths, one from the reservoir at a point below the liquid level therein to the receptor, said path being established in a position which the valve assumes briefly, and the other from the receptor to a low pressure air vent, said path being established in a position in which the valve remains for substantial time periods.

CARRIE E. CAMPBELL,
*Administratrix of the Estate of Charles A. Campbell, Deceased.*